US008601021B2

(12) United States Patent
Kim et al.

(10) Patent No.: US 8,601,021 B2
(45) Date of Patent: Dec. 3, 2013

(54) EXPERIENCE INFORMATION PROCESSING APPARATUS AND METHOD FOR SOCIAL NETWORKING SERVICE

(75) Inventors: Jung Tae Kim, Daejeon (KR); Jong-Hoon Lee, Daejeon (KR); Hoon Ki Lee, Daejeon (KR); Euihyun Paik, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 209 days.

(21) Appl. No.: 12/952,808

(22) Filed: Nov. 23, 2010

(65) Prior Publication Data

US 2011/0179029 A1 Jul. 21, 2011

(30) Foreign Application Priority Data

Jan. 19, 2010 (KR) .................. 10-2010-0004704
Jun. 10, 2010 (KR) .................. 10-2010-0054724

(51) Int. Cl.
*G06F 17/30* (2006.01)

(52) U.S. Cl.
USPC ..................... 707/770; 707/737; 705/7.14

(58) Field of Classification Search
USPC ......... 707/600, 602, 736, 737, 738, 741, 743, 707/764, 766, 770, 771, 783, 784, 918, 921, 707/767; 705/7.11, 7.13, 7.14, 7.15, 7.25, 705/7.26, 7.34, 14.58, 14.64, 14.66, 7.29, 705/7.38, 7.41, 7.42, 320, 321
See application file for complete search history.

(56) References Cited

U.S. PATENT DOCUMENTS

| 8,108,414 | B2* | 1/2012 | Stackpole | 707/758 |
|---|---|---|---|---|
| 2008/0195664 | A1* | 8/2008 | Maharajh et al. | 707/104.1 |
| 2009/0022123 | A1 | 1/2009 | Bae et al. | |
| 2009/0248844 | A1 | 10/2009 | Sommer et al. | |
| 2010/0088372 | A1* | 4/2010 | Shridhar et al. | 709/204 |
| 2010/0161631 | A1* | 6/2010 | Yu et al. | 707/758 |
| 2010/0169363 | A1* | 7/2010 | Gaedcke | 707/769 |

FOREIGN PATENT DOCUMENTS

| EP | 2009920 A1 | 12/2008 |
|---|---|---|
| KR | 1020020017076 | 3/2002 |
| KR | 10-0525072 | 10/2005 |
| KR | 1020070065774 | 6/2007 |
| KR | 10-2008-0057903 | 6/2008 |
| KR | 10-2009-0007849 | 1/2009 |
| KR | 1020090072575 | 7/2009 |

* cited by examiner

*Primary Examiner* — Greta Robinson
(74) *Attorney, Agent, or Firm* — Nelson Mullins Riley & Scarborough LLP; Anthony A. Laurentano, Esq.

(57) ABSTRACT

An experience information processing apparatus for a social networking service, includes an ontology unit for providing a social ontology including social connection information and location information of a user and a service ontology including web service information, service location information and tag information. Further, the experience information processing apparatus includes an experience information management unit for extracting experience information content having location information from a plurality of mobile devices, classifying the extracted experience information content using the ontology unit to establish an experience information database, and searching the established experience information database based on the location information in response to a request from the mobile device to provide a social media service by linking the social connections information, the location information, and the tag information. Furthermore, the experience information processing apparatus includes an experience information storage unit for storing the experience information database.

10 Claims, 4 Drawing Sheets

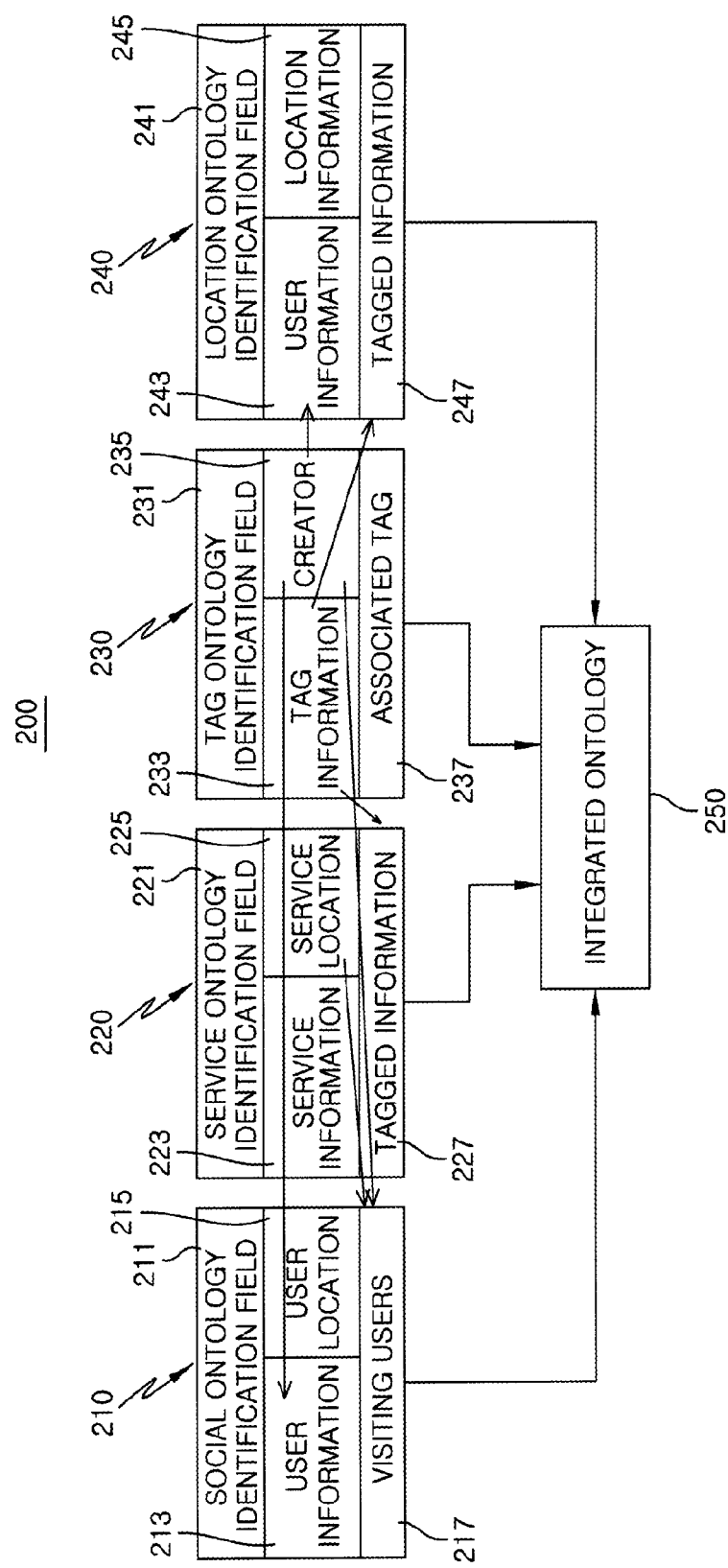

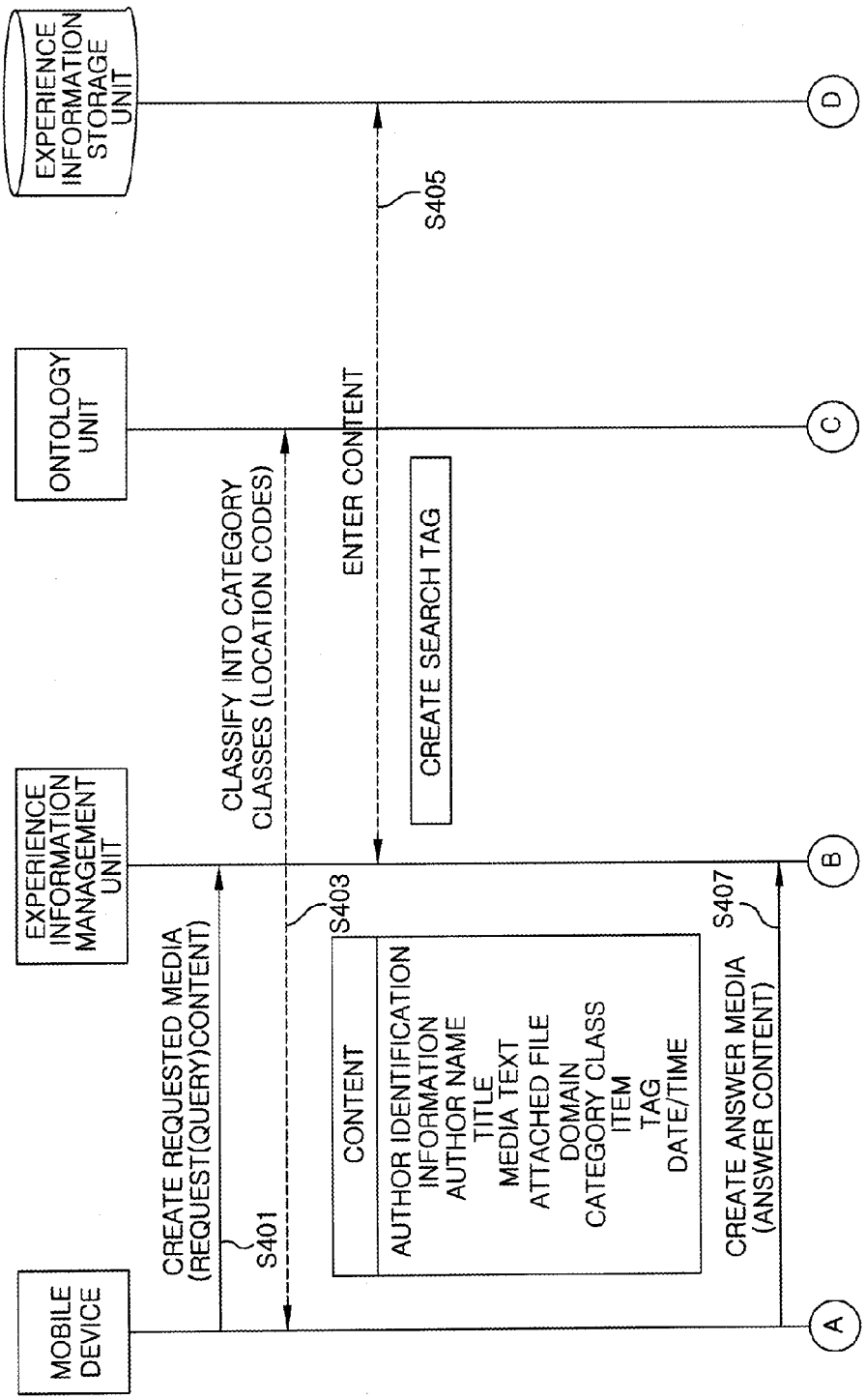

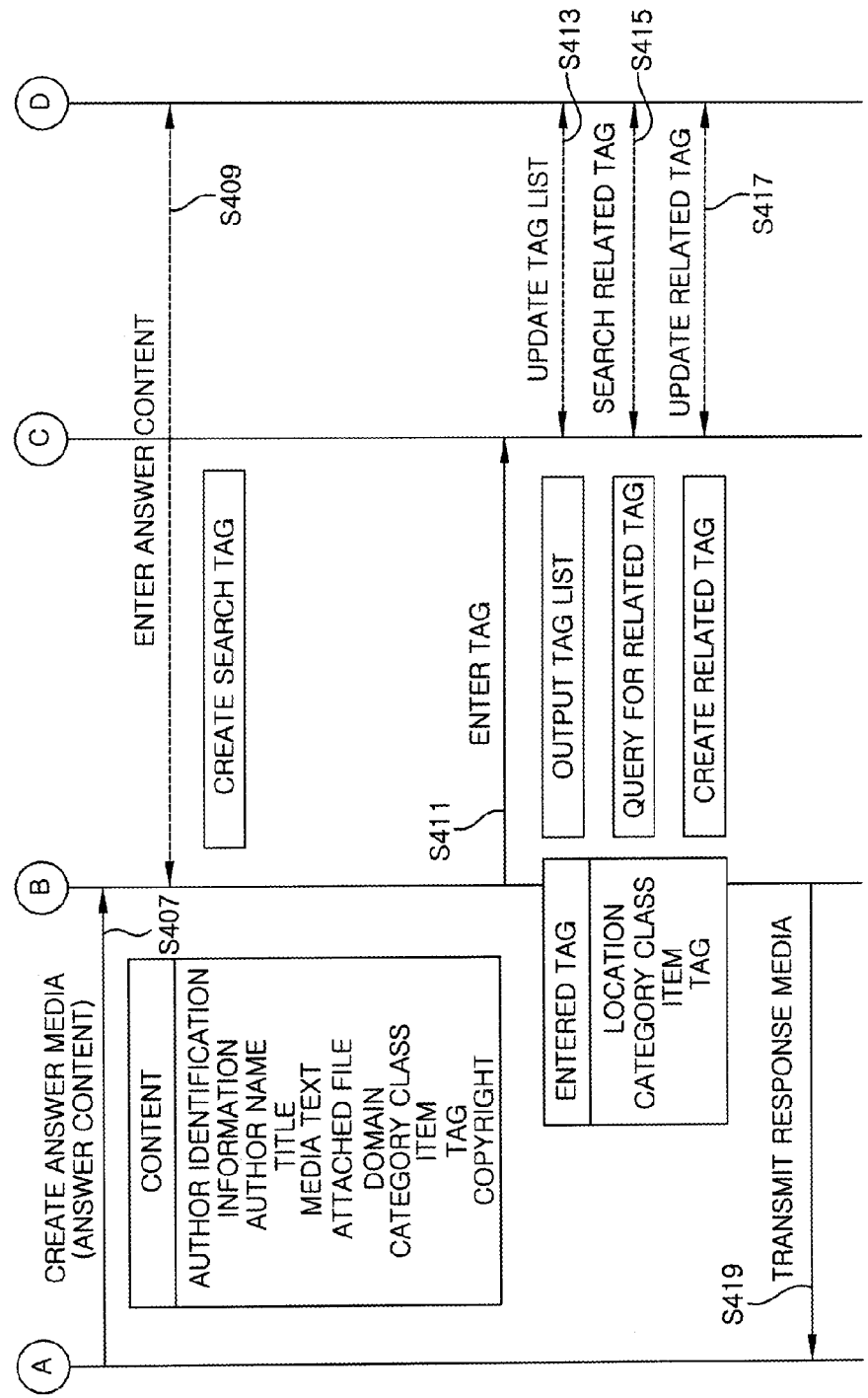

EXPERIENCE INFORMATION PROCESSING APPARATUS AND METHOD FOR SOCIAL NETWORKING SERVICE

CROSS-REFERENCE TO RELATED APPLICATION(S)

The present invention claims priority of Korean Patent Application No. 10-2010-0004704, filed on Jan. 19, 2010, and Korean Patent Application No. 10-2010-0054724, filed on Jun. 10, 2010, which are incorporated herein by references.

FIELD OF THE INVENTION

The present invention relates to an experience information processing apparatus and method for a social networking service; and more particularly, to an experience information processing apparatus and method for a social networking service, which can provide an intelligent social media service by information retrieval and sharing by establishing experience information generated based on a user location and social connections in a mobile device by using ontologies.

BACKGROUND OF THE INVENTION

A general keyword and tag-based social networking service is basically based on the functions of making connections and profile creation, and provides the functions of making connections, profile management, communication, and contents creation of a user, such as blogs, photos, videos and the like in the system.

However, the prior art has the drawback of not supporting semantic search, and also has wasted time in searching for user desired information because of low reliability of most of the information. Moreover, a mobile device using a social networking service can provide real-time spatial location information through a GPS, but it is difficult to achieve optimization of information to be provided because such real-time spatial location information is not properly utilized for the social networking service.

SUMMARY OF THE INVENTION

In view of the above, the present invention provides an experience information processing apparatus and method for a social networking service, which can provide an active and intelligent social media service by information retrieval and sharing by establishing experience information generated based on a user location and social connections in a mobile device by using an integrated ontology including a social ontology, a service ontology, a tag ontology, a location ontology and the like. For instance, the functions of uploading and managing experience information and intelligent information are provided by allowing users in their locations or spaces to instantaneously share information and form a network between people with whom the users have social connections, thereby achieving an intelligent social media service through the use of information of higher reliability.

In accordance with a first aspect of the present invention, there is provided an experience information processing apparatus for a social networking service. The experience information processing apparatus for the social networking service includes an ontology unit for providing a social ontology including social connection information and location information of a user and a service ontology including web service information, service location information and tag information; an experience information management unit for extracting experience information content having location information from a plurality of mobile devices, classifying the extracted experience information content using the ontology unit to establish an experience information database, and searching the established experience information database based on the location information in response to a request from the mobile device to provide a social media service by linking the social connections information, the location information, and the tag information; and an experience information storage unit for storing the experience information database.

In accordance with a second aspect of the present invention, there is provided a method for processing experience information by an experience information processing apparatus for a social networking service, including:

extracting, at a plurality of mobile devices, experience information content generated based on location information of a user and social connection information; classifying the extracted experience information content into category classes containing location codes; and storing the classified experience information content in an experience information database based on the location information and tag information.

In accordance with the embodiment of the present invention, it is possible to store and manage information generated by sharing knowledge and information uploaded by making relationship among users of common interest and from acquaintances using ontologies.

Accordingly, it is possible to provide an intelligent social media service by linking user information, location information, and tag information associated with the service using a mobile device equipped with the function of extracting location information, as well as service data, information ontologies, and information about social connections of the user, thereby enabling the user to easily make use of information of higher reliability.

BRIEF DESCRIPTION OF THE DRAWINGS

The objects and features of the present invention will become apparent from the following description of embodiments, given in conjunction with the accompanying drawings, in which:

FIG. 2 presents a detailed block diagram of an ontology unit shown in FIG. 1; and FIGS. 3A and 3B illustrate signal flow charts for explaining an experience information processing method for a social networking service in accordance with the embodiment of the present invention.

DETAILED DESCRIPTION OF THE EMBODIMENT

Figure 1:
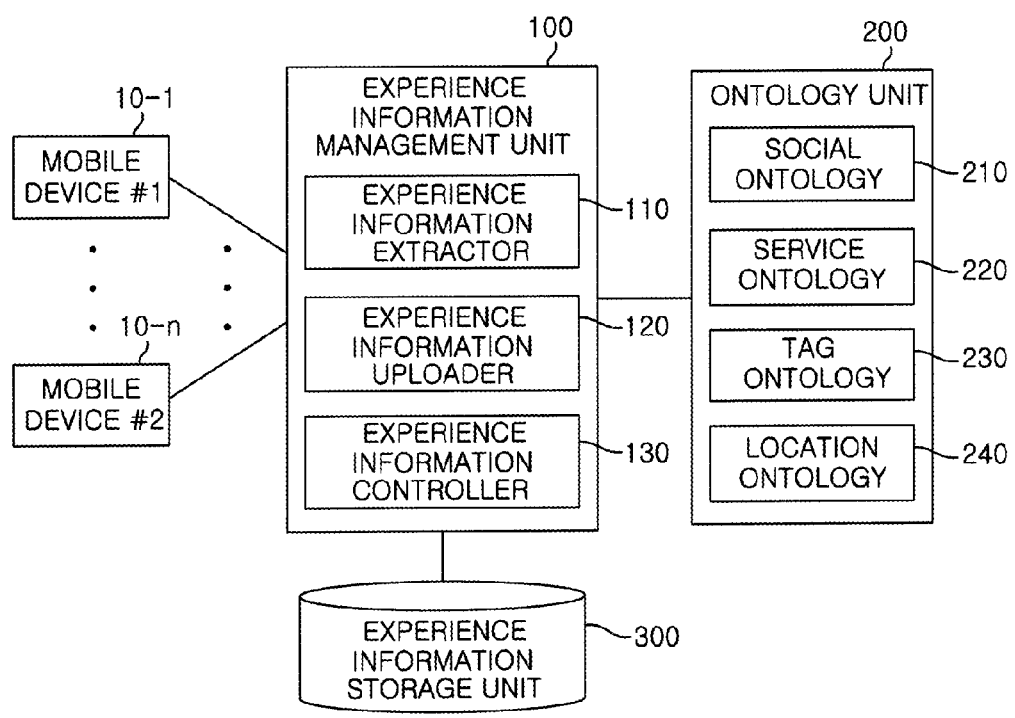
FIG. 1 shows a block diagram of an experience information processing apparatus for a social networking service in accordance with an embodiment of the present invention.

FIG. 1 shows a block diagram of an experience information processing apparatus for a social networking service in accordance with an embodiment of the present invention.

As shown in FIG. 1, the experience information processing apparatus in accordance with the embodiment of the present invention includes multiple mobile devices 10-1, ... and 10-n, an experience information management unit 100, an ontology unit 200 and an experience information storage unit 300.

The mobile devices 10-1, ... and 10-n are devices for inputting and outputting user information. These devices are equipped with an application program for storing and searching for experience information, a GPS module for collecting location information, and a radio transceiver for exchanging information through a mobile communication network or wireless local area network (LAN).

The experience information management unit 100 includes an experience information extractor 110, an experience information uploader 120 and an experience information controller 130.

The experience information extractor 110 extracts various types of experience information content including text, image, user created content (UCC), multimedia and the like, from the mobile devices 10-1, . . . and 10-n, classifies the extracted experience information content into types recognizable by the system, i.e., the experience information processing apparatus to link related information. For example, experience information can be classified into category classes including location codes.

The experience information uploader 120 uploads the experience information content extracted by the experience information extractor 110 to the experience information storage unit 300 to process and store the experience information content as social media. The social media content includes experience identification information, category, title, body, attached file, related tags, user identification information, location information and the like.

The experience information controller 130 makes a function of the information transmission that creates a database of the extracted experience information content to establish an experience information database using related tags and classification schemes to provide the established experience information database to the experience information uploader 120 to be stored in the experience information storage unit 300, provides the same through an application programming interface (API) to allow access to the stored experience information database, and enables the mobile devices 10-1, . . . and 10-n to present the experience information content in a form desired by the user. In addition, the experience information controller 130 defines the classification schemes for classifying the experience information content presented as social media, and provides an interlinking function for processing experience information.

The ontology unit 200 includes a social ontology 210, a service ontology 220, a tag ontology 230, and a location ontology 240.

FIG. 2 shows detailed configurations of the respective ontologies constituting the ontology unit 200.

The social ontology 210 includes an ontology identification field 211, a user information field 213, a user location field 215 and a visiting user field 217, classifies social connections of a user into family, work, friends, colleagues, others, and includes spatial relation information using spatial information related to a particular service location. Here, user details include basic personal information, such as ID, name, sex, email address, photo, and the like, and also includes location information (user location) associated with the current service.

This social ontology 210 is implemented as shown in the following embodiment.

[Social Ontology]

```
<owl:Class rdf:ID="people">
    <rdfs:subClassOf>
        <owl:Class rdf:ID="agent"/>
```

[Social Ontology]

```
    </rdfs:subClassOf>
</owl:Class>
<owl:ObjectProperty rdf:ID="child">
    <owl:inverseOf>
        <owl:ObjectProperty rdf:ID="parent"/>
    </owl:inverseOf>
    <rdfs:subPropertyOf>
        <owl:ObjectProperty rdf:ID="knowsAsFamily"/>
    </rdfs:subPropertyOf>
</owl:ObjectProperty>
<owl:ObjectProperty rdf:about="#knowsAsFamily">
    <rdfs:subPropertyOf>
        <owl:ObjectProperty rdf:ID="knows"/>
    </rdfs:subPropertyOf>
</owl:ObjectProperty>
<owl:ObjectProperty rdf:ID="girlfriend">
    <owl:inverseOf>
        <owl:ObjectProperty rdf:ID="boyfriend"/>
    </owl:inverseOf>
    <rdfs:subPropertyOf>
        <owl:ObjectProperty rdf:ID="romanticallyKnows"/>
    </rdfs:subPropertyOf>
</owl:ObjectProperty>
<owl:ObjectProperty rdf:ID="hasVisitor">
    <owl:inverseOf>
        <owl:ObjectProperty rdf:ID="visited"/>
    </owl:inverseOf>
```

The service ontology 220 includes an ontology identification field 221, a service information field 223, a service location field 225, and a tagged information field 227, and reconfigures web service data and information based on the classification schemes to include user and tag information therein. That is, the service ontology 220 divides information of a service in use by the corresponding user into large categories, middle categories, and small categories to include relevant information for each detailed service information (instance) within the ontology, and supports the provision of a dynamic service based on location in conjunction with the user location field 215 of the social ontology 210.

This service ontology 220 is implemented as shown in the following embodiment.

[Service Ontology]

```
<owl:Class rdf:ID="pension">
    <rdfs:subClassOf>
        <owl:Class rdf:ID="lodging-related things"/>
    </rdfs:subClassOf>
</owl:Class>
<owl:Class rdf:ID="hospital">
    <rdfs:subClassOf>
        <owl:Class rdf:ID="health-related things"/>
    </rdfs:subClassOf>
</owl:Class>
```

The tag ontology 230 includes an ontology identification field 231, a tag information field 233, a creator field 235, and an associated tag field 237, and manages tag information which is tag-related information included in each service information, creator and the like.

This tag ontology 230 is implemented as shown in the following embodiment.

```
[Tag Ontology]

<fishing rdf:ID="fishing_011">
    <locatedIn rdf:resource="#race"/>
    <relatedTag>
        <tag rdf:ID="Tag042">
            <tagOwnership rdf:resource = "#fishing_011"/>
        </tag>
    </relatedTag>
    <tourID
rdf:datatype="http://www.w3.org/2001/XMLSchema#string"
        >S-022-011</tourID>
    <title
rdf:datatype="http://www.w3.org/2001/XMLSchema#string"
        >territory</title></fishing>
```

The location ontology 240 includes a location ontology identification field 241, a user information field 243, a location information field 245, and a tagged-information field 247.

This location ontology 240 is implemented as shown in the following embodiment.

```
[Location Ontology]

<owl:Class rdf:ID="district">
    <rdfs:subClassOf>
        <owl:Class rdf:ID="country"/>
    <rdfs:subClassOf>
    </owl:Class>
```

The social ontology 210, the service ontology 220, the tag ontology 230, and the location ontology 240 are merged to establish an integrated ontology 250 as shown in FIG. 2, thereby making it easier to search for related services and tag information.

In FIG. 2, the arrows between the ontologies indicate correlations between the fields, through which the ontologies can be linked to each other.

The experience information storage unit 300 stores the experience information database created by the experience information management unit 100. Here, the experience information database includes an experience information content, user information and service information.

FIGS. 3A and 3B illustrate signal flow charts for explaining an experience information processing method for a social networking service in accordance with an embodiment of the present invention.

First, the mobile devices 10-1, . . . and 10-n generates experience information based on a user location and social connections and transmits the generated experience information to the experience information management unit 100. Here, the types of the content transmitted to the experience information management unit 100 from the mobile devices 10-1, . . . and 10-n are divided into content for queries or requests and content for answers. FIG. 3 is an illustration of an embodiment in which the content for queries or requests is provided in step S401 and the content for answers is provided in step S407.

The request (query) content transmitted in step S401 includes author identification information, author name, title, media text, attached file, domain, category class, item, date and time of tagging, and the like, and the answer content transmitted in step S407 includes author identification information, author name, media text, attached file, domain, category class, item, tag, copyright, and the like.

In step S401 or S407, the experience information extractor 110 of the experience information management unit 100 extracts various types of experience information including text, image, user created content (UCC), multimedia and the like, from the mobile devices 10-1, . . . and 10-n, and classifies the extracted experience information into category classes including location codes to enable the experience information processing apparatus to recognize the extracted experience information in step S403.

Next, the experience information uploader 120 of the experience management unit 100 uploads the experience information extracted by the experience information extractor 110 to the experience information storage unit 300 to process and store the experience information as social media.

Moreover, the experience information uploader 120 of the experience information management unit 100 classifies the extracted experience information based on the social ontology 210, the service ontology 220, the tag ontology 230, and the location ontology 240 of the ontology unit 200, and creates a search tag and stores the created search tag in the experience information storage unit 300 in steps S405 or S409. The experience information established as described above is provided through an application programming interface (API) to allow easy access.

Next, the experience information management unit 100 enters the corresponding tag in the ontology unit 200 when it is desired to search for the experience information stored in the experience information storage unit 300. For example, the entered tag includes location, category class, item, tag, and the like in step S411.

When tag list information is outputted by the experience information management unit 110 and provided to the ontology unit 200, a tag list of the experience information storage unit 300 is updated in step S413. When related tag query information is provided to the ontology unit 200 from the experience information management unit 100, related tag search is performed in step S415. When related tag creation information is provided to the ontology unit 200 from the experience information management unit 100, related tag is updated in step S417. In step S417, interactions with a metadata database for comment creation and tag addition are made by adding experience information.

Further, the experience information management unit 100 transmits experience response media acquired in steps S411 to S417 to the mobile devices 10-1, . . . and 10-n, thereby allowing the mobile devices 10-1, . . . and 10-n to share the experience information generated based on a user location and social connections.

While the invention has been shown and described with respect to the embodiments, it will be understood by those skilled in the art that various changes and modifications may be made without departing from the scope of the invention as defined in the following claims.

What is claimed is:

1. An experience information processing apparatus for a social networking service, comprising:

an ontology unit for providing a social ontology including social connection information and location information of a user and a service ontology including web service information, service location information and tag information indicative of a tag ontology;

an experience information management unit for extracting experience information content having location information from a plurality of mobile devices, classifying the extracted experience information content using the ontology unit to establish an experience information database, creating a machine-generated search tag based on the social ontology, the service ontology, the location information and the tag ontology, and searching the established experience information database based on the location information in response to a request from the mobile device to provide a social media service by linking the social connections information, the location information, and the tag information; and an experience information storage unit for storing the experience information database.

2. The experience information processing apparatus of claim 1, wherein the ontology unit includes a tag ontology having the tag information and creator information and a location ontology having the location information and the tag information.

3. The experience information processing apparatus of claim 2, wherein the social ontology, the service ontology, the tag ontology and the location ontology are merged to establish an integrated ontology.

4. The experience information processing apparatus of claim 1, wherein the experience information management unit includes:

an experience information extractor for extracting the experience information content from the plurality of mobile devices;

an experience information uploader for creating a database of the extracted experience information content using related tags and classification schemes to establish an experience information database; and an experience information controller for storing the established experience information database in the experience information storage unit.

5. The experience information processing apparatus of claim 4, wherein the experience information extractor classifies the extracted experience information content into types recognizable by the experience information processing apparatus.

6. The experience information processing apparatus of claim 4, wherein the experience information controller provides the established experience information database through an application programming interface (API).

7. A method for processing experience information by an experience information processing apparatus for a social networking service, comprising:

extracting, at a plurality of mobile devices, experience information content generated based on location information of a user and social connection information;

classifying the extracted experience information content into category classes containing location codes based on a social ontology, a service ontology, the location information and tag information indicative of a tag ontology;

creating a machine-generated search tag based on the social connection information, the service ontology, the location information and the tag ontology, and storing the classified experience information content in an experience information database based on the location information and tag information.

8. The method of claim 7, wherein said extracting experience information content separately extracts the experience information content as content for queries or requests and content for answers.

9. The method of claim 7, further comprising:

searching the experience information database based on the location information in response to requests from the plurality of mobile devices; and providing a social media service by linking the social connection information, the location information and the tag information based on the searching result.

10. The method of claim 9, wherein said providing a social media service provides the experience information database through an application programming interface (API).

* * * * *